Patented Jan. 9, 1923.

1,441,238

UNITED STATES PATENT OFFICE.

GEORGE H. MORRIS, OF MACON, GEORGIA.

DEVICE FOR PREVENTING THE ACCUMULATION OF MOISTURE UPON THE WINDSHIELDS OF AUTOMOBILES AND THE LIKE.

Application filed September 26, 1921. Serial No. 503,327.

*To all whom it may concern:*

Be it known that I, GEORGE H. MORRIS, a citizen of the United States, residing at Macon, in the county of Bibb and State of Georgia, have invented certain new and useful Improvements in a Device for Preventing the Accumulation of Moisture upon the Windshields of Automobiles and the like, of which the following is a specification, reference being had therein to the accompanying drawings.

This invention relates to a device for preventing the accumulation of moisture upon windshields and it has for its object the provision of a simple and economical structure by virtue of which the windshields of automobiles and the windows of cars, locomotives and the like may be kept clean from the accumulation of rain, snow or the like, so that impairment of the vision of drivers of such vehicles will be effectually prevented.

Further objects and advantages of the invention will be set forth in the detailed description which follows.

Figure 1:
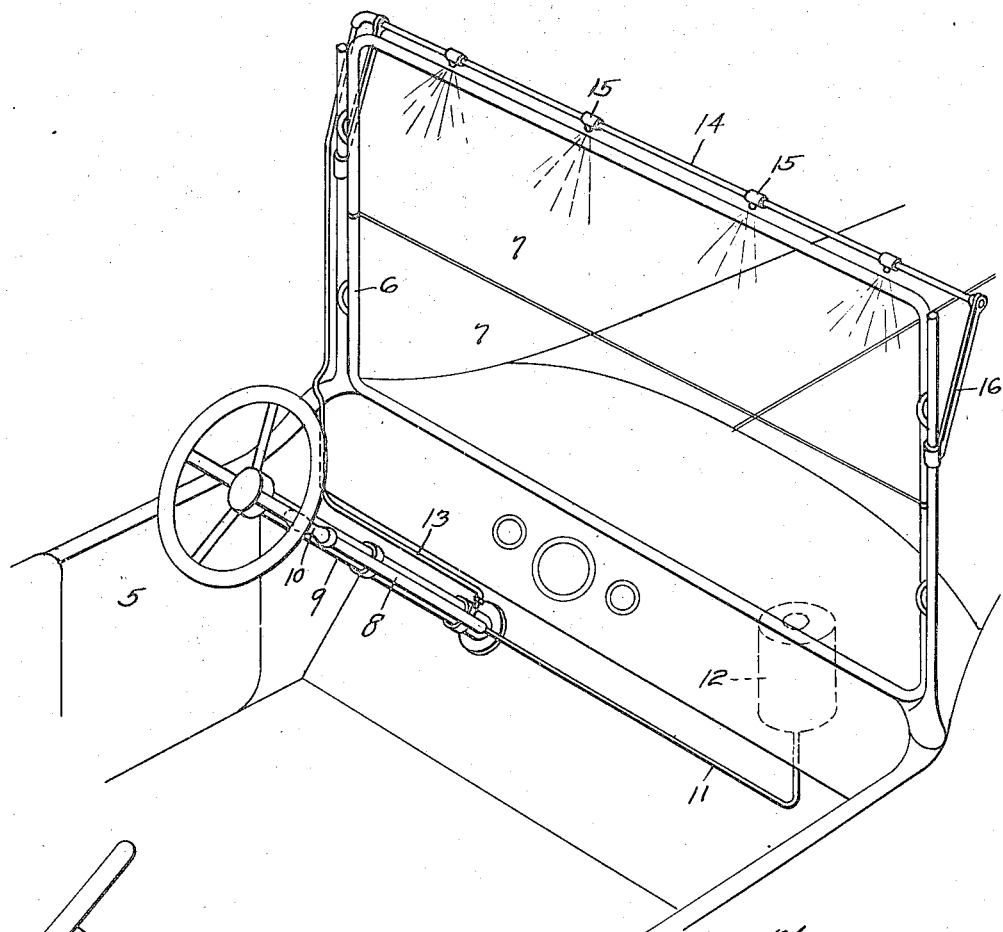
Figure 2:
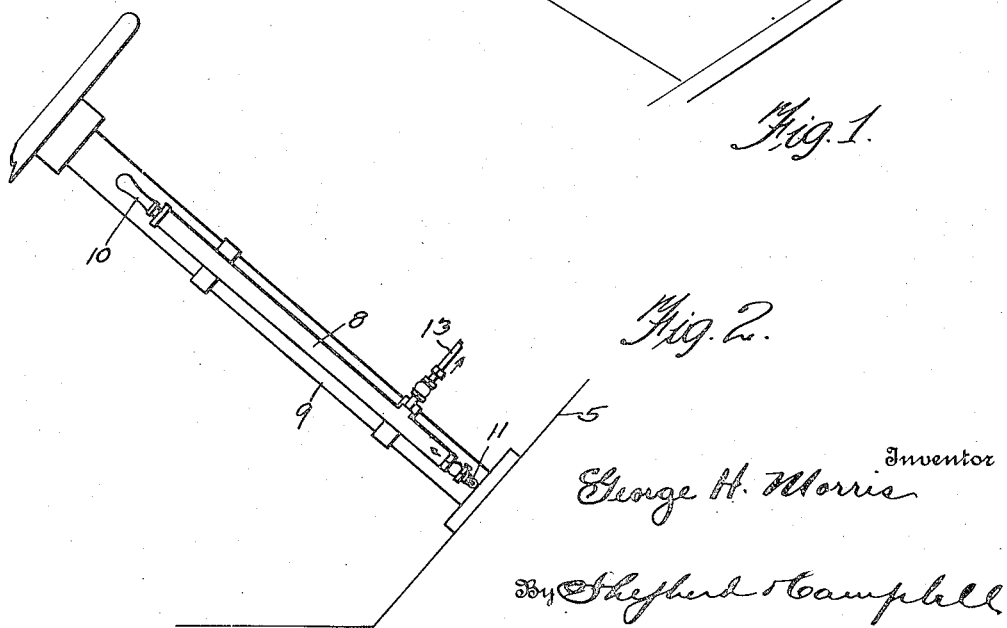

In the accompanying drawing:

Fig. 1 is a fragmentary perspective view of a part of an automobile having the invention applied thereto; and Fig. 2 is a detail side view of a pump associated with the steering column of the automobile.

Like numerals designate corresponding parts in both of the Figs. of the drawing.

Referring to the drawing 5 designates the body, 6 the windshield frame and 7 the glass of a windshield, of an automobile.

In carrying out the invention, I clamp a pump 8 to the steering column 9 of the automobile, this pump being hand operated through the medium of a hand grasp 10 upon its plunger. When the plunger is drawn upwardly a liquid is drawn into the pump through a supply pipe 11 from a tank 12 and when the plunger is forced downwardly this liquid is ejected through a discharge pipe 13 which extends upwardly alongside of the windshield frame into a transversely extending spray pipe 14 which has a plurality of spray nozzles 15 in its length. This spray pipe is supported from the windshield frame by any suitable type of bracket 16.

The liquid carried in the supply tank 12 is of a nature to prevent the accumulation of moisture upon the windshield. It will be understood that only a very small quantity of this liquid is required and that only when it is raining or snowing.

It is, therefore, to be understood that the invention is not limited to the precise construction set forth but that it includes within its purview whatever changes fairly come within either the terms or the spirit of the appended claims.

Having described my invention what I claim is:

1. A device of the character described comprising in combination an automobile having a windshield, a supply tank mounted upon the automobile, a pump, a suction line between the pump and supply tank, a discharge line for the pump, brackets connected to the frame of the windshield, a horizontally disposed pipe supported in said brackets and extending across the upper part of the windshield and outwardly thereof, said spray pipe being connected to the discharge line of the pump.

2. A device of the character described comprising in combination an automobile having a windshield and a steering column, a pump secured to the steering column and having a handle at its upper end, a supply tank, a suction line between the pump and the supply tank, a discharge line from the pump, outwardly inclined brackets secured to the sides of the frame of the windshield, a spray pipe supported in the upper ends of said brackets and substantially in line with the top of the windshield, said spray pipe having a plurality of nozzles associated therewith spaced across the face of the windshield, and a connection between said spray pipe and the discharge line of the pump, said pump acting when its handle is manipulated to spray a moisture repellant liquid through said nozzles upon the windshield and at a plurality of points in the width thereof.

In testimony whereof I hereunto affix my signature.

GEORGE H. MORRIS.